Patented Aug. 8, 1950

2,517,906

UNITED STATES PATENT OFFICE 2,517,906

DRY PLASTIC COMPOSITION CONTAINING UREA - FORMALDEHYDE CONDENSATE, PLASTER OF PARIS, WHEAT FLOUR, AND VENEER DUST

Sara M. Mayfield, Tuscaloosa, Ala.

No Drawing. Application September 10, 1947, Serial No. 773,305

1 Claim. (Cl. 260—6)

This invention relates to a molding composition, and particularly to one employing a water soluble condensation product as the principal binding agent, and has for an object the provision of a composition of the character designated which may be molded and set by the addition of water thereto, either at room temperature, or under heat and pressure. Although any water soluble condensation product may be used, I prefer a urea-formaldehyde or phenolic product.

A further object of my invention is to provide a molding composition employing a urea-formaldehyde condensation product as the principal binding agent and which shall be effective to produce molded articles of uniform quality, free of surface cracks.

A still further object of my invention is to provide a molding composition embodying a cellulosic filler and a urea-formaldehyde condensation product as a binder and which shall contain as an essential component a protein containing substance which shall inhibit the formation of surface cracks on articles molded therefrom.

A still further object of my invention is to produce an inexpensive, dry, plastic composition which can be packaged and sold in a powder form and used by the mere addition of water for mending, crack-filling, molding, modeling, sculpting, or which may be molded under heat and pressure.

I have discovered that the well known water soluble urea-formaldehyde condensation product with a suitable, inexpensive filler, may be modified by the addition of a cement such as plaster of Paris and a protein-containing substance, such as wheat flour, a smooth, uniform, molded product can be produced which is cold setting, or in which the setting may be aided by heat alone or heat and pressure. Where heat and pressure are employed in the molding operation, suitable plasticizers such as linseed oil, castor oil, or the well known glycol plasticizers may be employed.

By way of example, my improved molding composition may comprise the following:

| | Parts |
|---|---|
| Water soluble urea-formaldehyde condensation product | 36 to 39 |
| Plaster of Paris | 19 to 21 |
| Wheat flour | 15 to 18 |
| Filler | 8 to 25 |

For the purposes for which I have employed my composition, I have found veneer dust of a size passing a 100 mesh screen to be an ideal filler. From 8 to 25 parts of this veneer dust may be incorporated in the composition, depending upon the use to which the composition is to be put. For the making of hard objects such as wall board, tile, and the like, I employ as much as 25 parts of veneer dust. Where the composition is to be employed for molding, modeling, and casting, I employ from 15 to 18 parts. Where it is employed for turning, sculpting, as a mastic, or as a glazer, facing or coating, I may employ from 7 to 9 parts of veneer dust.

In preparing the composition, the veneer dust is dried and screened through a 100 mesh screen; the other components are added, and mixed in a high-speed electric mixing machine. I have found that high-speed mixing is essential to obtaining a uniform product with the required particle size. A high-speed agitator in the mixing operation tends to break up the particles of plaster of Paris, thoroughly mix it with the filler, and to disseminate and break up the urea-formaldehyde condensation product. When prepared, the product should be packaged under uniform conditions of temperature and humidity, preferably around 80° F. and at about 70% humidity.

Where a composition is being made in which extra tensile strength is required, a fibrous filler may be substituted for the veneer dust. I have found exploded wood fiber or fiber obtained from cotton stalks to be suitable.

I have found that the wheat flour incorporated in my improved molding composition, which contains ordinarily from 11 to 13 per cent of gluten, as well as starch, adds sufficient protein to afford excellent molding properties.

To use the composition cold, water of a temperature of 60° to 70° F. is added to three parts of the prepared composition, using more or less water according to the consistency desired; mix thoroughly and allow the preparation to stand for 10 to 15 minutes; knead into the desired consistency, whereupon it may be used for mending, crack filling, molding, modeling, sculpting or troweling.

By the addition of 10% or more of alcohol to the water with which the plastic is mixed, freezing will be prevented and drying hastened.

In the manufacture of tile, suitable pigments are added to the composition, a suitable plasticizer is added, and the mixture is molded under heat and pressure. As will also be well understood by those skilled in the art, various fillers, fluxing agents, plasticizers, and pigments may be employed with my improved composition. For example, ground cork, exploded sand, natural chalks, clays or kaolins, glass fibers, or natural fibers may be employed as fillers and the plastic may be used as a molding powder, may be molded under heat and pressure, injected, or extruded. By employing graphite, collodial graphite, carbon black, or similar materials, as a filler, molded objects made therefrom may be electro-plated. My composition is inexpensive, varied in use, easy to handle, of high tensile strength, non-inflammable, possesses good insulating properties, and good resistance to water, acid, alkalis, ultra-violet light, and crystallization.

While I have described several ways of carrying out my invention, it will be obvious to those skilled in the art that it is not so limited, but that it is susceptible of various changes and modifications, and I desire, therefore, that only such limitations shall be placed thereon as are specifically set forth in the appended claim.

What I claim is:

A molding composition comprising from 36 to 39 parts water soluble urea-formaldehyde condensation product, from 19 to 21 parts plaster of Paris, from 15 to 18 parts wheat flour, and from 8 to 25 parts veneer dust.

SARA M. MAYFIELD.

REFERENCES CITED

The following references are of record in the file of this patent:

UNITED STATES PATENTS

| Number | Name | Date |
|---|---|---|
| 1,049,251 | Mayer et al. | Dec. 31, 1912 |
| 1,203,720 | Elder | Nov. 7, 1916 |
| 2,075,804 | Ellis | Apr. 6, 1937 |
| 2,407,225 | Dixon | Sept. 10, 1946 |

FOREIGN PATENTS

| Number | Country | Date |
|---|---|---|
| 206,963 | Switzerland | Apr. 20, 1938 |